United States Patent [19]

Golz et al.

[11] 4,014,632

[45] Mar. 29, 1977

[54] PNEUMATIC TIRE MOLD

[75] Inventors: Reinhard Heinz Golz; William James Johnson, both of Akron, Ohio

[73] Assignee: The B. F. Goodrich Company, Akron, Ohio

[22] Filed: June 14, 1976

[21] Appl. No.: 695,944

[52] U.S. Cl. .............................. 425/28 R; 425/36; 425/58

[51] Int. Cl.² .......................................... B29H 5/02

[58] Field of Search ................. 425/11, 17, 18, 19, 425/20, 21, 28 R, 33, 34, 35, 36, 37, 39, 43, 44, 46, 47, 58; 156/128, 135

[56] References Cited

UNITED STATES PATENTS

| | | | |
|---|---|---|---|
| 1,915,963 | 6/1933 | Wait | 156/135 |
| 2,380,380 | 7/1945 | Bacon | 425/28 R |
| 2,625,981 | 1/1953 | Wallace | 156/135 X |
| 2,822,026 | 2/1958 | Willis | 156/135 |
| 2,888,058 | 5/1959 | Manis et al. | 156/135 X |
| 3,184,794 | 5/1965 | Sherkin | 425/36 X |
| 3,310,838 | 3/1967 | Sornsen | 425/11 |
| 3,794,457 | 2/1974 | Gaquit | 425/28 R |

*Primary Examiner*—J. Howard Flint, Jr.
*Attorney, Agent, or Firm*—Robert M. Leonardi; Harry F. Pepper, Jr.

[57] ABSTRACT

A mold for vulcanizing tires includes an annular bead molding ring. The bead molding ring has a toe edge, a bead flat surface and a toe portion. The toe portion comprises a support which projects radially outwardly from the bead flat surface. The toe portion may comprise a plurality of circumferentially spaced and axially extending supports. The amount of radial projection of each support may progressively decrease or taper at axially spaced locations increasingly spaced from the toe edge of the bead molding ring.

7 Claims, 3 Drawing Figures

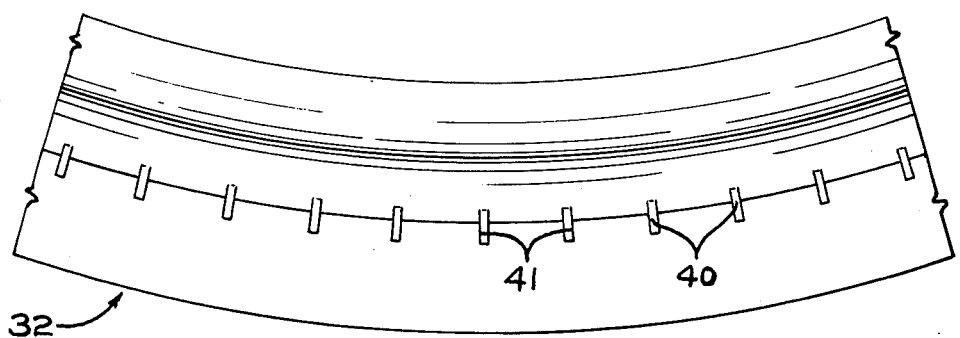
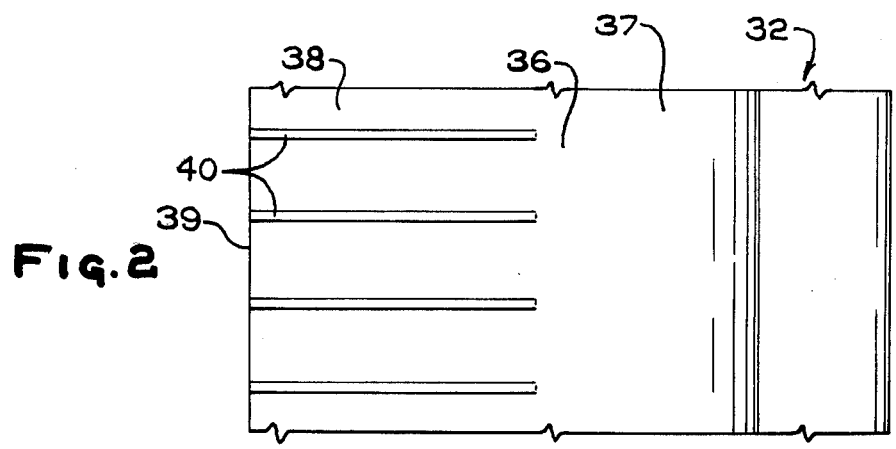
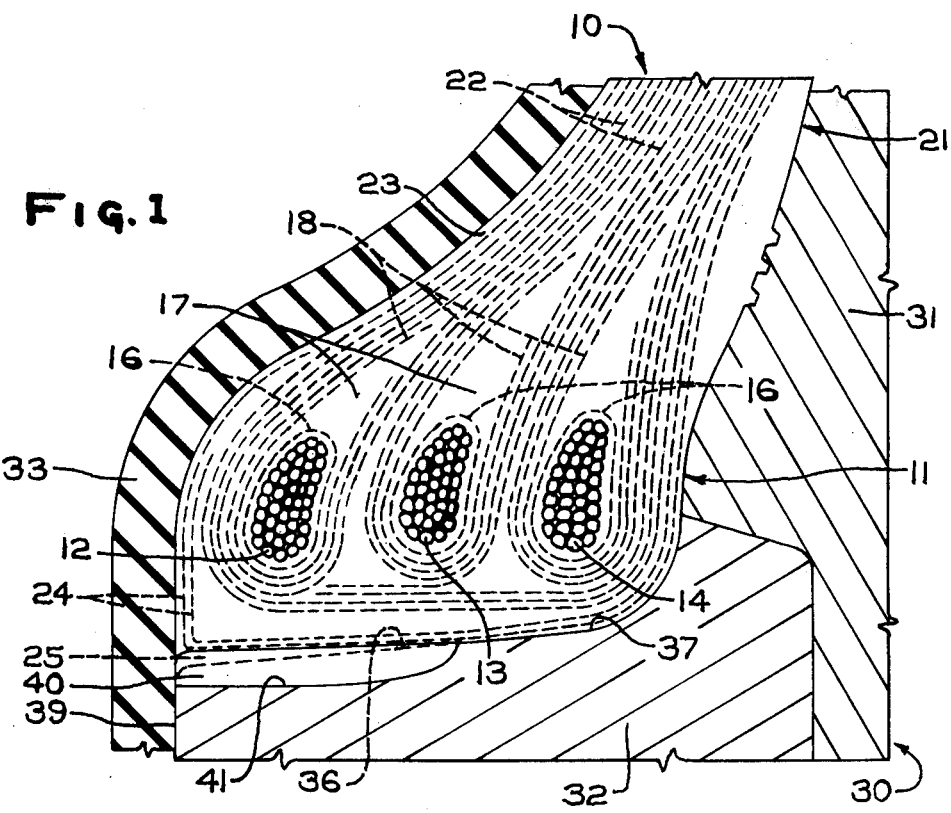

PNEUMATIC TIRE MOLD

BACKGROUND

This invention relates to pneumatic tire molds and more particularly to the bead molding rings of pneumatic tire molds.

Pneumatic tires generally have two annular beads, each of which is comprised of at least one annular bead core. Bead cores are generally formed from a plurality of wound wires. When tires are built, the end portions of the carcass plies are firmly secured to the beads by wrapping them around the bead cores. Multiple bead cores are often used to increase tire stability in heavy duty tires such as aircraft, truck or off-the-road tires.

During vulcanization the beads of a tire are given a specifically designed profile which enables them to properly seat on the rim upon which the tire is intended to be mounted. In tubeless tires, the bead profile is especially critical because the sealing of air within the tire is dependent upon an airtight fit of the beads with the rim.

In operation, as each tread portion of a tire rotates through its footprint, the adjacent sidewalls bulge out. This bulging can cause relative movement between the bead and its associated rim portion. Bead movement can occur in the circumferential and axial directions relative to the rim. This movement may cause abrasion or chafing of the bead.

Excessive abrasion of the bead can cause the cords of the tire carcass to become exposed. If the cords are exposed, "air-wicking" may occur, whereby the pressurized air within the tire cavity passes internally through the ply cords to the sidewall and tread areas of the tire. The air will ultimately escape from the tire because the sidewall and tread rubber is not compounded to prevent air permeation.

To protect the ply cords from chafing and therefore to reduce the possibility of air-wicking, a finishing strip or chafer is often built into the bead of the tire. The finishing strip surrounds portions of the carcass plies which are wrapped around the bead core. Finishing strips are often of square woven nylon fabric which is specially treated to be nonair-wicking.

Excessive abrasive forces applied to the bead of a tire can also chafe a finishing strip if it is not well protected. To protect a finishing strip against deterioration due to chafing, it should be covered with a layer of tough, abrasive resistant rubber. The toe portion of the bead should especially be protected because most of the axial movement of the bead against the rim is concentrated inwardly of a hinge point near the toe of the bead. When building a tire, a layer of rubber can easily be applied at the bead over the finishing strip.

High compression forces are exerted upon the beads of a tire when it is vulcanized in a mold. The high molding compression can cause finishing strips and carcass plies to be pushed to the surface of the bead, thereby forcing some or all of the protective layer of rubber out of the mold. If a thin layer of the protective rubber remains covering the finishing strips and plies, some protection will be provided. However, a thicker layer of rubber is more desirable because it can absorb more deflection without deteriorating. A thin layer is more easily abraded and delaminated from the finishing strips. Delamination of the carcass plies can ultimately occur.

The beads of a tire must remain in good condition for the tire to remain operable. When the finishing strips and carcass plies deteriorate, the tire carcass is unusable and essentially irreparable. This can be a substantial loss, especially in heavy duty tires for use on aircraft, trucks, or off-the-road vehicles. These types of tire are generally retreaded several times.

Although abrasive forces are existent in virtually all types of tire, heavy duty tires are especially affected. Heavy duty tires often operate under severe conditions which can accelerate bead chafing. Such operating conditions include excessive braking head and heavy loads that can cause excessive deflection. A thicker layer of protective rubber is therefore required in these types of tires.

Some heavy duty tires may have four to twelve carcass plies which are wrapped around a bead core, thereby creating a large volume of material underneath the bead core that must be compressed during vulcanization. This can compound the aforementioned problem of high compressive forces in the bead area during vulcanization.

Prior attempts at maintaining a protective layer of rubber over the fabric at the beads of a tire have included the use of several rubber compounds. However, no compound has been found to completely eliminate the flowing of rubber under the high compression forces applied during vulcanization. Semi-cured compounds have been suggested, but they are difficult to handle in a factory setting, difficult to age control, and difficult to adhere to the tire. Larger beads and lower molding compressions have also been proposed. Neither of these proposals have provided satisfactory results, primarily because of the critical function of the beads and the resulting specificity required in bead design.

SUMMARY OF THE INVENTION

It is an object of the present invention to provide a tire vulcanization mold adapted to vulcanize a tire which can withstand the abrasive forces applied by a tire rim.

It is a further object of the present invention to provide a tire vulcanization mold capable of vulcanizing a tire having its beads protected by an adequate layer of abrasion resistant rubber.

It is a further object of the present invention to provide a tire vulcanization mold adapted to vulcanize an adequate layer of abrasion resistant rubber on an area of a tire bead which is adapted to be in contact with a rim.

These and other objects of the present invention which will become apparent from the following detailed description are achieved by a tire vulcanization mold having an annular bead molding ring comprising a bead flat surface. The bead molding ring further comprises a toe portion which includes a support which projects radially outwardly from the bead flat surface. A plurality of circumferentially spaced, axially extending supports may be provided at the toe portion. The amount of radial projection of each support may progressively decrease or taper at axially spaced locations increasingly spaced from the toe edge of the bead molding ring.

BRIEF DESCRIPTION OF THE DRAWINGS

FIG. 1 is a cross-sectional view of a bead portion of a tire in a mold of the present invention;

FIG. 2 is a top view of the bead molding ring of the mold of FIG. 1;

FIG. 3 is a side view of the bead molding ring of the mold of FIG. 1.

DETAILED DESCRIPTION OF A PRESENTLY PREFERRED EMBODIMENT

FIG. 1 is a cross-sectional view of a portion of a mold 30 containing a portion of a tire 10 designed for aircraft or similar heavy industrial use. The tire has a bead 11 and a sidewall portion 21. The bead 11 includes wound steel wire bead cores 12, 13 and 14. Each bead core is taped with a fabric bead wrap 16 and is encircled by a highly compressed rubber apex strip 17. Fabric flippers 18 are wrapped around each bead core and apex strip. The sidewall 21 has several carcass plies 22 which extend around the tire in a manner well known in the art. The end portions of the carcass plies 22 are wrapped around one or more bead cores 12, 13 and 14 to anchor the tire carcass to the beads. The tire 10 is a tubeless tire and therefore has an elastomeric and air impermeable innerliner 23 on the inner surface of the tire carcass.

Fabric finishing strips 24 of a square woven nylon material cover the carcass plies 22 at the bead 11. A layer of tough abrasive resistant rubber 25 covers the outer finishing strip 24. The rubber 25 can be calendered onto the outer finishing strip 24 or can be applied to the finishing strip in a separate step during the tire-building process. The layer of rubber 25 has an approximate thickness of 0.040 inches in the tire of FIG. 1. It should be noted that the layer of rubber 25 may be necessary to protect the bead area whether or not a finishing strip is used in the tire.

The vulcanization mold 30 comprises a mold section 31 which is adapted to mate with a bead molding ring 32. The mold section 31 is designed to give the proper profile to the sidewall and tread areas of the tire 10, while the bead molding ring 32 is designed to properly shape the bead of the tire for proper fitting with the rim upon which the tire is designed to be mounted.

The bead molding ring 32 consists of a bead flat surface 36 which extends at an angle of about 5° to the axis of the bead molding ring 32. This axis corresponds to the axis of rotation of the molded tire 10. The surface of the molding ring 32 in contact with the tire bead has a rounded heel portion 37 and a toe portion 38 opposite the heel portion 37. (See FIG. 2) In the present embodiment, the diameter of the molding ring 32 at the bead flat surface 36 is about 19.4 inches at the toe portion 38 and about 19.9 inches at the heel portion 37.

Referring to FIGS. 1, 2 and 3, it can be seen that a plurality of support members in the form of fins 40 are inserted into mating slots 41 in the toe portion 38 of the molding ring 32. The fins 40 and the slots 41 are equally and circumferentially spaced around the molding ring 32, and extend generally parallel to the aforementioned axis of rotation of the molding ring. In the present embodiment, it is preferred to have about 108 fins around the molding ring 32, thereby requiring circumferential spacing of about 0.564 inches between fins. The fins 40 in the present embodiment have a thickness of about 0.062 inches and a maximum height of about 0.312 inches.

A portion of each support member or fin 40 projects radially outwardly above the bead flat surface 36 of the molding ring 32. The maximum radial projection of each fin 40, about 0.100 inches in the present embodiment, occurs at the toe edge 39 of the molding ring. The amount of radial projection of each fin 40 at axially spaced locations on each fin decreases as the distance of that location from the toe edge 39 increases. At a location about midway between the toe edge 39 and the heel portion 37, the fins 40 become fully imbedded in the molding ring 32. In the present embodiment, the fins 40 are about 1.875 inches in length. There is some radial projection from the bead flat surface at substantially all locations along the length of the fins 40. The radially outward edge of fin 40 extends at an angle of about 1.5° to the axis of the bead ring.

It is desirable that the fins 40 in the present embodiment are relatively thin. This will cause the layer of rubber 25, which will be in contact with a rim, to be almost continuous. As the fins such as 40 become thicker, the layer of rubber 25 will contain wider slits. The slits in the rubber 25 can ultimately become so wide as to themselves become surfaces which will be in contact with the rim, thereby exposing insufficiently protected finishing strips or carcass plies to the abrasive forces between the rim and the tire. These excessively wide support members should therefore be avoided.

The fins 40 in the present embodiment are of steel, but any other suitable material, such as aluminum, may be used. The fins 40 are also shown as separate components distinct from the bead molding ring 32. It should be noted that supports or fins integral with a molding ring are within the scope of this invention. It should also be noted that the contours of the fin shaped support members 40 illustrated are a presently preferred design and that other possible distinctive contours found satisfactory are to be considered within the scope of the present invention.

To vulcanize a tire in the mold of the present invention, the tire is placed inside the mold portion 31 with the bead area 11 adjacent the bead molding ring 32. Mold portion 31 is joined to a mating mold portion (not shown) thereby creating a mold cavity in which the tire is molded. A bladder 33 is expanded against the interior surface of the tire carcass, forcing the tire against the mold. Heat is simultaneously applied to the tire from sources within the bladder 33 and within the mold portions such as 31.

When the bead of the tire is compressed between the bladder and the mold, the layer of rubber 25 can be dislocated or squeezed out of the mold by forces which are transmitted through the carcass plys and finishing strips 24. However, the spaced thin fins 40 will penetrate the layer of rubber 25 and will support the beads along the surface of finishing strips 24 at the toe portion of the tire. A space is thereby provided under the carcass plys and finishing strips 24 for the layer of rubber 25 to cure.

As a result of this molding process the portion of the finishing strips and carcass plies at the toe of the bead will be protected by an adequate layer of rubber 25 against chafing due to movement of the bead relative to the rim. The tire will therefore have adequate protection because most of the abrasive forces are concentrated inward of a hinge point near the toe of the bead. The tire will have a plurality of slits in its bead flat surface extending essentially parallel to the axis of rotation of the tire. The slits will not extend to the heel portion of the tire. If the tire is tubeless, its sealing capabilities will not be substantially affected because the heel portion of the tire bead provides for the sealing of the tire to the rim.

Although the foregoing has been described for the purpose of illustrating a presently preferred embodiment of the invention, it should be understood that many modifications or alterations may be made without departing from the spirit and the scope of the invention as set forth in the appended claims.

We claim:

1. In a pneumatic tire mold having an annular bead molding ring, said bead molding ring comprising a toe edge for positioning adjacent a bladder, a toe portion adjacent said toe edge, and an annular bead flat surface for shaping a bead area of a tire, the improvement wherein said toe portion comprises support means projecting radially outwardly from said flat bead surface.

2. A pneumatic tire mold as defined in claim 1 wherein said support means comprises a plurality of support members, each of said members projecting radially outwardly from said flat bead surface.

3. A pneumatic tire mold as defined in claim 2 wherein each of said plurality of support members comprises a fin.

4. A pneumatic tire mold as defined in claim 2 wherein said plurality of radially outwardly extending support members are equally and circumferentially spaced.

5. A pneumatic tire mold as defined in claim 1 wherein said support means extends axially in a direction substantially parallel to the axis of rotation of said tire.

6. A pneumatic tire mold as defined in claim 1 wherein said support means projects radially outwardly a first predetermined distance from said bead flat surface at said toe edge of said bead molding ring and wherein said support means projects radially outwardly a second predetermined distance from said bead flat surface at a location axially outward from said toe edge, said second predetermined distance being less than said first predetermined distance.

7. A pneumatic tire mold as defined in claim 1 wherein said support means is essentially steel.

* * * * *